Aug. 13, 1929.                          B. McCOLLUM                          1,724,495
                        METHOD AND APPARATUS FOR DETERMINING THE
                             SLOPE OF SUBSURFACE ROCK BOUNDARIES
                                      Filed Oct. 24, 1923

Burton McCollum
Inventor

Patented Aug. 13, 1929.

1,724,495

UNITED STATES PATENT OFFICE.

BURTON McCOLLUM, OF WASHINGTON, DISTRICT OF COLUMBIA, ASSIGNOR TO McCOLLUM GEOLOGICAL EXPLORATIONS, INC., A CORPORATION OF DELAWARE.

METHOD AND APPARATUS FOR DETERMINING THE SLOPE OF SUBSURFACE-ROCK BOUNDARIES.

Application filed October 24, 1923. Serial No. 670,619.

My invention relates to methods of determining the contour of subterranean strata or boundaries of geologic formations and has among its objects the study of subsurface geological conditions at depths greater than can be conveniently and economically reached by means heretofore available. My invention is particularly adapted to determining the location of deposits of certain valuable minerals, mineral oils and other valuable deposits which are more or less definitely related to subsurface geogical conditions. My invention depends upon the broad principle of sending sound waves down into the portions of the earth to be studied and measuring the time intervals required for certain components of these sound waves to travel through certain well defined paths. The term "sound wave" is employed in the sense as it is used by physicists and includes any elastic wave traveling in any elastic medium, whether a gas, liquid or solid. These time intervals being known and the velocity of sound in the various subterranean rocks being determined once for all, the distances traveled by these sound components can then be determined. By properly utilizing this principle in the manner described below, I am able to determine much valuable information regarding the character and contour of the subsurface formation. My invention is fully described in the following specification, reference being made to the accompanying drawings.

For the sake of clearness and brevity my invention is described below with particular reference to but one of its practical applications, namely, the study and the determination of the contours of subsurface sedimentary formations. It will readily be seen, however, that the method may be applied to determine geological contours under a great variety of other conditions.

It is well known that in regions where deposits of oil or gas may be encountered, these deposits are not distributed generally throughout the area but are highly localized in pools occupying a relatively small portion of the total area. The location of these pools is governed by a well known geological principle, namely, that they are associated with the anticlinal folds of the subsurface sedimentary rocks. A problem of great practical importance, therefore, is the determination of the location of these anticlinal folds and this is one of the important applications of my invention.

It will readily be seen that if one determines the direction of the slope of the rocks with respect to horizontal at various places, any reversal of the direction of this slope will mark the presence of an anticlinal or synclinal fold, and a knowledge of the direction of the slope on either side of the fold will show also whether the fold is anticlinal or synclinal. The direct object of my invention, therefore, is the determination of the slope of subsurface strata in any desired locality.

Figure 1:
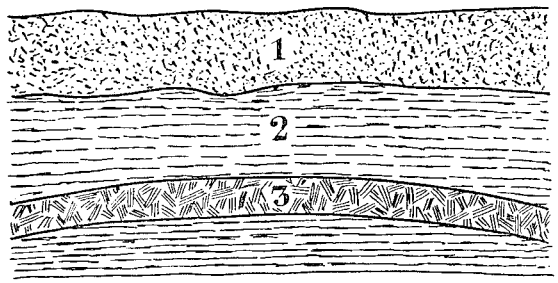
Fig. 1 is a diagram illustrating the fundamental object of my invention.

Fig. 1 shows diagrammatically the nature of the problem with which we have to deal. Here a surface layer of soil 1 overlies a layer of rocks 2, such as shale, which in turn is underlaid by a layer of sedimentary rock 3, such for example as limestone or sandstone. Similarly as we go deeper we encounter recurrently various types of sedimentary rocks until finally igneous rocks such as granite are encountered. In general it is well known that in most cases the surface contour of the soil layer 1 and the upper boundary of the shale zone 2 bear no definite relationship to the contour of the subsurface strata, but that in general in the case of the deeper sedimentary rock layers 3, which in practice are usually of limestone or sandstone, the contours offer a fairly definite criterion of the contours of still deeper strata with which the oil deposits are associated. In its simplest form, therefore, the problem is one of determining the direction of the slope in any desired locality of the rock layer 3 and in particular to determine where the slope reverses in direction thereby producing an anticline.

Figure 2:
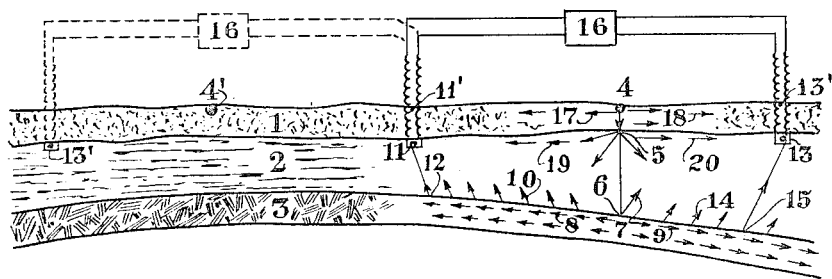
Fig. 2 illustrates one practical application of my invention.

The essential principle of my invention may be understood by a reference to Fig. 2. Here as in Fig. 1 we are dealing with a surface layer 1 of more or less completely disintegrated rock or soil, a subsurface layer 2, a typical representative of which is an unweathered shale, and a deeper sedimentary rock 3, such as limestone or sandstone, the slope of which is to be determined at any desired locality.

Suppose now a source of sound such for example as a charge of explosive to be placed at the point 4. It will be understood that when the explosion occurs the sound wave will travel downward through the weathered surface layer 1 encountering the more or less irregular rock layer 2. The acoustic effects which transpire in the earth under these conditions are extremely complex, but for our present purposes we need consider only a portion of the phenomena involved. My experiments have shown that when the sound wave strikes the surface of the shale at the point 5 a part of the sound passes on downward as a direct transmitted wave. When this sound wave reaches the rock layer 3 at the point 6 there will as before be a certain portion of the energy transmitted on downward to greater depths. A certain portion of the energy, however, will be reflected back as shown by the arrow 7 while another portion will be diffracted laterally as indicated by the arrows 8 and 9, and as these diffracted waves travel radially outward in all directions, they will give rise constantly to secondary diffracted waves passing in an upward direction through the zone 2 as shown by the small arrows 10 at substantially constant angle to the stratum 3, and these diffracted waves travel back toward the surface. If now, a detector of sound energy 11 of any well known type but preferably similar to that disclosed in my application Serial No. 581,866 be placed at some point in the unweathered shale, preferably for mechanical and economical reasons near the top of the shale, these secondary diffracted waves emanating from some point as at 12 will travel upward and actuate the detector. Similarly we may place a second detector 13 also near the top of the unweathered shale and so located that the points 11 and 13 are equidistant in a horizontal direction from and symmetrically located with respect to the source 4. It will be seen that here as in the case just described the diffracted wave 9 will give rise to secondary diffracted waves 14 which leaving the rock layer 3 at some point such as 15 will travel upward and actuate the detector 13. Since now the distance from the point 6 to the point 12 and from the point 6 to the point 15 are for all practical purposes identical, and since the sound waves travel common paths between the points 4 and 6 it will be evident that the diffracted waves will reach the points 12 and 15 at the same time. This being true it will be further apparent that the difference in time of arrival of the secondary diffracted waves at the points 11 and 13, respectively, will be proportional to the difference in depth of the shale 2 beneath the detectors 11 and 13.

If now, the sound detectors 11 and 13 are of such type as to produce an electrical disturbance when actuated by sound waves and these detectors are connected by wires to a central recorder 16, the difference in time of arrival of the sound waves at 11 and 13 may be readily determined with great accuracy by means too well known to require explanation here. It will readily be seen that if the recorder shows that the sound wave reaches the detector 11 before it reaches the detector 13, then the depth of the rock layer 2 will be less underneath the point 11 than it is underneath the point 13. In other words, the boundary between the rock layer 2 and the rock layer 3 slopes downward in a direction toward the right. If now the source of sound be placed at a second point as at 4′, and the detector 13 be moved to a corresponding point 13′ and the experiment repeated, we can determine in a similar way whether the rock layer 2 underneath the point 13′ is deeper or shallower than it is underneath the point 11. By proceeding in this way continuously in a horizontal direction the point at which the rock layer 2 has the least depth can readily be determined and in that way the apex of the anticline located.

In considering the practical application of this method a certain important phenomenon has to be taken into account. Not only do the sound waves travel on the indirect path as described above but there will also be a direct wave travel laterally in either direction from the source 4 as shown by the arrows 17 and 18 and these waves on arrival at the detectors 11 and 13 respectively, will actuate them with an intensity usually far greater than that caused by the indirect diffracted waves above discussed. Furthermore, experience shows that the direct waves usually persist for a considerable time due to vibrations of the surface rocks and soil, so that if these waves reach the detectors ahead of the diffracted waves, the latter will be completely obscured by the former. The method above described, therefore, can be used only under such conditions that the diffracted waves traveling by the indirect path described above reach the detectors ahead of the direct waves 17 and 18. Fortunately, experience shows that the velocity of sound in sandstones and limestones, corresponding to the rock zone 3 which as a rule are the ones the contour of which it is desirable to determine, is very much greater than the velocity of sound in shales comprising the rock layer 2. It will be evident, therefore, that if the detectors 11 and 13 are placed at a distance sufficiently remote from the source 4 in comparison with the depth of the rock layer 2, it will be possible because of the relatively high velocity of sound in the rock layer 3 to secure an arrangement whereby the diffracted waves traveling by the indirect path will reach the detectors ahead of the relatively slow-traveling direct waves. This condition, therefore, represents an important condition precedent to the practical application of my method.

It will be apparent that the higher the velocity in the rock layer 3 as compared to that in the rock layer 2, the closer together the source 4 and either of the detectors can be. Obviously the minimum distance between the source 4 and either of the detectors even in the case of infinte velocity in the rock layer 3 will be twice the depth of the rock layer 2, and since the velocity of sound in rocks is always finite, it follows that the distance between the source 4 and either detector must always be greater than twice the depth of the rock layer 2. Under most practical conditions the approximate depth of the rock is usually known. It is not necessary to know this, however, in order to get the proper spacing between the source and the detectors. My experiments show that the character of the wave coming to the detector from the direct path is very different from that which comes to the detector by diffraction through the indirect path, and once this difference is understood, an examination of a preliminary record will show definitely whether the spacing between the source and the detector is sufficient and if not, an additional spacing will be used.

In the foregoing it has been assumed for simplicity that the detectors 11 and 13 and the source 4 all lie in a vertical plane. It will readily be seen, however, that this simple conditions is not necessary nor in all cases desirable. The essential condition is that the detectors 11 and 13 shall be equidistant in a horizontal direction from the sound source 4. This condition will be realized if the source 4 and the detectors 11 and 13 are placed at the corners of an isosceles triangle with the source 4 at the apex of the triangle. Furthermore, instead of using two detectors of sound waves any number of sound detectors can be used, it being only necessary to place these detectors on a circle with the source of sound at the center. With this arrangement it will be seen that the sound wave will reach a point in the underlying rocks where the secondary diffracted wave leaves in the direction of any one detector at the same time as for all other detectors, so that the difference in time of arrival of sound waves at the different detectors affords a measure of the difference in depth of the rocks overlying the rock layer in which the high velocity sound wave travels. By connecting all these detectors to a single central station recorder the relative depths of the latter at a large number of places can be determined simultaneously with a single shot or other source.

I have found that instead of using a shot various other sources, such as a ballistic impact against the earth similar to that caused by a falling weight may be used. A heavy drill dropping in a completed or partly completed well offers a satisfactory source and makes it possible to explore the slope of the rocks in the large territory surrounding the well.

As shown here the sound source 4 is placed at or near the surface. This condition, however, is not necessary and in many cases it is desirable to place the sound source at a greater depth and it may even be in or below the rock layer 3, the slope of which is to be determined. In some cases also I have successfully used the source consisting of a charge of explosive placed in the air above the surface of the earth.

Further in explanation of the method and system indicated in Fig. 2, it will be understood that the sound wave travels outwardly and downwardly in a hemispherical wave issuing from the source at 4. So long as the medium remains uniform, this wave front will remain spherical, that is, will not be distorted or deformed. If, however, a limited portion of the wave front encounters a medium of higher velocity, that portion of the wave front will advance ahead of the remainder of the wave. It is in accord with Huygens principle that each portion of the wave front may be regarded as a center of disturbance from which sound energy radiates in all directions. According to this principle, therefore, that portion of the wave which encounters the higher velocity medium sends out wave energy in all directions in that higher velocity medium, as assumed in the foregoing description. Furthermore, that part of the wave which travels laterally along the high velocity medium, as indicated in Fig. 2 by arrows 8 and 9, since it outruns the wave in the overlying shale or medium, will, in accord with Huygens principle, be a source of constant radiation into the overlying medium or shale, as indicated by the arrows 10. Accordingly, the travel of a portion of the sound energy from the source to the detector, by way of the indirect route indicated, is due to operation in accord with Huygens principle.

As above described, we have assumed that use is made of diffracted waves traveling laterally in a rock layer of high acoustic velocity anywhere below the surface. It will be evident that similar phenomena occur at the same time in still deeper rock layers in which the velocity of sound is sufficiently high and finally in the igneous rocks which underlie the sedimentary rocks. As a rule the velocity of sound in the igneous rocks, such as granite, is very high in comparison with that of most sedimentary formations, and if desired the source 4 and the detectors can be placed far enough apart to utilize diffracted waves traveling in the underlying granites and in this way ridges or peaks in the granite rocks can be determined.

Figure 3:
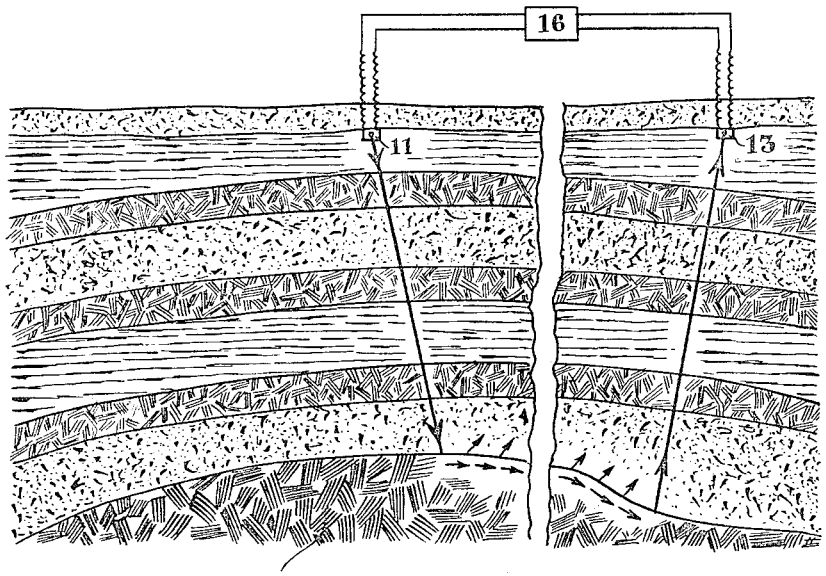
Fig. 3 illustrates a modified principle of my invention.

An embodiment of this is shown in Fig. 3. In this case it will be seen that if the velocity of sound in the granite 21 is higher than that of any of the overlying rock layers, it is possible to make the spacing between the source 4 and the detector 11 great enough so that the diffracted wave through the granite is the first to reach the detector and in that event the method described above can be applied. It is to be understood that in both Fig. 2 and Fig. 3 the source 4 may be on a straight line joining the detectors 11 and 13, or it may be displaced to any desired extent as long as it remains at the center of a circle on which lie the vertical projections on a horizontal plane of the points occupied by the detectors.

In the foregoing description it will be noted that the sound detectors are placed down in the unweathered rocks entirely below the surface layer of soil. This arrangement gives a comparatively easy record to analyze, but is by no means necessary. The detectors 11 and 13 may be placed at the points 11' and 13' near the surface and the same procedure followed in obtaining the records. In this case, however, we have to take into account an additional group of time intervals in order to determine the relative depth of the rock layer 2 under the points 11 and 13 respectively. The following analysis of the essential phenomena involved will make this clear.

Consider now the various components of the time required for the sound to travel from the source 4 to the detectors by several routes assuming the detectors to be at the points 11' and 13' respectively. To go from the point 4 to the point 11' by the route above described, we have to consider three time intervals, viz: $t_1$ the time required for the sound to travel from the source 4 to the point 12, where the secondary diffracted wave leaves the rock layer 3; $t_2$ the time for this wave to travel upward from the point 12 to the point 11; and $t_3$ the time required for the wave to travel in the surface layer from the point 11 to the point 11'. Similarly the wave traveling to the detector 13' by way of the points 6 and 15, occupies the time $t_4$ required to reach the point 15; $t_5$ the time required between the points 15 and 13; and $t_6$ the time required in going from the point 13 to the point 13'. Hence the difference in time of arrival of the two waves at the two detectors will be:

$$\Delta T_1 = (t_4 + t_5 + t_6) - (t_1 + t_2 + t_3) \quad \text{(1)}$$

Since as explained above $t_1 = t_4$, $t_2$, this reduces to:

$$\Delta T_1 = (t_5 + t_6) - (t_2 + t_3) \quad \text{(2)}$$

This is the quantity that is measured directly from the record. Since the velocity of sound in the weathered surface layer is quite variable as well as low, it follows that the times $t_6$ and $t_3$ are both large and uncertain and may completely obscure the difference $t_5 - t_2$ which it is desired to determine. However, we have a second pair of wave components traveling from the source to the detectors. These travel on the one hand to the point 11' by way of the point 5, and the path shown by the arrows 19 to the point 11, which occupies a time interval $t_7$; thence from the point 11 to the point 11' in time $t_3$, as in the case of the first wave. The total time here is therefore $t_7 + t_3$. Similarly the wave traveling to the detector 13' by the corresponding route via the point 5 and then directly as shown by the arrows 20 to the point 13 occupies the time $t_8$ to reach the point 13 and a further time $t_6$ to go from the point 13' to the detector at the point 13'. The total time here is $t_8 + t_6$. Hence the difference in time of arrival of these two waves at the respective detectors is:

$$\Delta T_2 = (t_8 + t_6) - (t_7 + t_3) \quad \text{(3)}$$

Since as stated above the detectors are equidistant from the source 4 in a horizontal plane it follows that $t_8 = t_7$. Hence:

$$\Delta T_2 = t_6 - t_3 \quad \text{(4)}$$

If the spacing of the detectors from the source 4 be great enough the wave traveling by way of the high velocity path in the rock layer 3 will all pass before the arrival of the next pair of waves by way of the second and shorter but lower velocity path. This being realized, it is evident that the value of $\Delta T_2$ can be obtained from the records in the same way as the value of $\Delta T_1$. $\Delta T_1$ and $\Delta T_2$, therefore, become known quantities. Combining equations (2) and (4) we have:

$$\Delta T_2 - \Delta T_1 = (t_6 - t_3) - (t_5 + t_6 - t_2 - t_3)$$
$$\therefore \Delta T_2 - \Delta T_1 = t_2 - t_5$$

Since $\Delta T_2$ and $\Delta T_1$ are known, the value of the time difference $t_2 - t_5$ becomes known and this gives directly the relative depth of the rock layer 3 under the two detectors, which as explained above is the thing to be determined in order that the average slope between these points may be determined.

I claim:

1. The method of determining the slope of subterranean rocks, having a higher sound velocity than overlying formations, consisting in placing a plurality of detectors of sound waves at points substantially equidistant in a horizontal plane from a source of sound, sending out simultaneously a plurality of sound components from the said source and measuring the differences in time of arrival of corresponding components at the several detectors, and calculating therefrom the differences in length of the vertical components of the paths of the said sound waves, thereby obtaining a measure of the said slope.

2. The method of determining the slope of subterranean rocks having a higher sound velocity than overlying formations, consisting in placing a plurality of detectors of sound waves at points substantially equidistant in a horizontal plane from a source of sound and distant therefrom by more than twice the thickness of the said overlying formations, connecting said detectors to a central recorder adapted to measure the differences in time of arrival at the said detectors of different components of sound waves, sending out simultaneously a plurality of sound components from the said source and measuring with said central recorder the differences in time of arrival of the several corresponding components of sound waves at the several detectors, and calculating therefrom the differences in length of the vertical components of the paths of the said sound waves.

3. An apparatus for determining the slope of subterranean rocks, having a higher velocity of sound than overlying formations, comprising a source of sound, a plurality of simultaneously operative detectors of sound waves, and a recording device, the sound detectors, being spaced apart and equidistant in substantially a horizontal direction from the said source, and the said recording device being so connected to the said detectors as to measure the difference in time of arrival at the said detectors of sound waves from the said source.

4. An apparatus for determining the slope of subterranean rocks, having a higher velocity of sound than overlying formations, comprising a source of sound, a plurality of simultaneously operative detectors of sound waves, and a recording device, the sound detectors being spaced apart and equidistant in substantially a horizontal direction from the said source, and the said recording device being so connected to the said detectors as to measure the difference in time of arrival at the said detectors of sound waves from the said source, the said detectors being placed at a sufficient distance from the said source so that diffracted sound waves transmitted indirectly through subsurface rocks of high sound velocity reach the said detectors prior to the arrival of waves traveling by more direct paths in overlying rocks of lower sound velocity.

5. In the art of subterranean exploration, the method which comprises transmitting wave energy downwardly from a source through the earth to a subterranean formation, and determining the difference in the times of arrival of a returning wave at a plurality of points substantially equidistant from the said source.

6. The method of determining the slope of a subterranean formation in which the velocity of wave propagation is higher than in the overlying formation, which comprises transmitting wave energy from a source through the overlying formation, and determining the difference in times of arrival of a returning wave at a plurality of points substantially equidistant from the wave source.

7. The method of determining the slope of a subterranean formation in which the velocity of wave propagation is higher than in the overlying formation, which comprises transmitting wave energy from a source through the overlying formation, and determining the difference in times of arrival of a returning wave at a plurality of points substantially equidistant from the wave source and distant therefrom more than twice the thickness of said overlying formation.

8. The method of determining the slope of subterranean rocks, having a higher sound velocity than overlying formations, which comprises placing a plurality of detectors of sound waves at points substantially equidistant in a horizontal plane from a source of sound, producing sound waves by said source of sound, measuring the differences in time of arrival of corresponding diffracted and re-radiated components of said waves at the several detectors, and calculating therefrom the differences in length of vertical components of the paths of said re-radiated components of said sound waves, thereby obtaining a measure of said slope.

9. The method of determining the slope of subterranean strata having a higher sound velocity than overlying formations, which comprises placing a plurality of detectors of sound waves at points substantially equidistant in a horizontal plane from a source of sound and distant therefrom by more than twice the thickness of said overlying formations, connecting said detectors to a common recorder adapted to measure the differences in time of arrival at said detectors of different components of sound waves, producing sound waves by said source of sound, measuring with said recorder the differences in time of arrival at said several detectors of corresponding components of said waves diffracted and re-radiated by said strata, and calculating therefrom the differences in length of vertical components of the paths of said re-radiated components of said sound waves, thereby obtaining a measure of said slope.

In testimony whereof I affix my signature.

BURTON McCOLLUM.

CERTIFICATE OF CORRECTION.

Patent No. 1,724,495.   Granted August 13, 1929, to

BURTON McCOLLUM.

It is hereby certified that error appears in the printed specification of the above numbered patent requiring correction as follows: Page 1, line 12, for the misspelled word "geoogical" read geological; page 3, line 27, for the misspelled word "infinte" read infinite; page 4, line 78, strike out the third term of the equation "$t_2$,"; and that the said Letters Patent should be read with these corrections therein that the same may conform to the record of the case in the Patent Office.

Signed and sealed this 9th day of September, A. D. 1930.

(Seal)

M. J. Moore,
Acting Commissioner of Patents.

CERTIFICATE OF CORRECTION.

Patent No. 1,724,495.                     Granted August 13, 1929, to

BURTON McCOLLUM.

It is hereby certified that error appears in the printed specification of the above numbered patent requiring correction as follows: Page 1, line 12, for the misspelled word "geoogical" read geological; page 3, line 27, for the misspelled word "infinte" read infinite; page 4, line 78, strike out the third term of the equation "$t_2$,"; and that the said Letters Patent should be read with these corrections therein that the same may conform to the record of the case in the Patent Office.

Signed and sealed this 9th day of September, A. D. 1930.

(Seal)                                                        M. J. Moore,
                                                              Acting Commissioner of Patents.